United States Patent
Iwata (10) Patent No.: US 6,327,020 B1
(45) Date of Patent: Dec. 4, 2001

(54) FULL-SURROUND SPHERICAL SCREEN PROJECTION SYSTEM AND RECORDING APPARATUS THEREFOR

(75) Inventor: Hiroo Iwata, 2-23-21, Kasuga, Tsukuba-shi, Ibaraki 305-0821 (JP)

(73) Assignees: Hiroo Iwata, Ibaraki; Laboratories of Image Information Science and Technology, Osaka, both of (JP)

( * ) Notice: Subject to any disclaimer, the term of this patent is extended or adjusted under 35 U.S.C. 154(b) by 0 days.

(21) Appl. No.: 09/508,985

(22) PCT Filed: Aug. 4, 1999

(86) PCT No.: PCT/JP99/04251

§ 371 Date: Mar. 17, 2000

§ 102(e) Date: Mar. 17, 2000

(87) PCT Pub. No.: WO00/10055

PCT Pub. Date: Feb. 24, 2000

(30) Foreign Application Priority Data

Aug. 10, 1998 (JP) .................................................. 10-225089

(51) Int. Cl.[7] .............................. G03B 37/00; H04N 7/00
(52) U.S. Cl. .................................................. 352/69; 348/36
(58) Field of Search .................................. 352/69, 70, 85, 352/132, 198; 348/36, 39, 776, 206; 359/443, 451; 396/351; 434/44

(56) References Cited

U.S. PATENT DOCUMENTS

| | | | |
|---|---|---|---|
| 2,299,682 | * 10/1942 | Conant | 396/351 |
| 3,692,934 | * 9/1972 | Herndon | 348/36 |
| 3,740,469 | * 6/1973 | Herndon | 348/36 |
| 3,998,532 | 12/1976 | Dykes | 352/69 |
| 4,246,603 | * 1/1981 | Wolff | 358/87 |
| 4,421,486 | * 12/1983 | Baldwin | 434/44 |
| 4,464,029 | 8/1984 | Jaulmes | 352/69 |
| 4,656,506 | * 4/1987 | Ritchey | 348/39 |

FOREIGN PATENT DOCUMENTS

373638 * 1/1964 (CH) ...................................... 352/69

* cited by examiner

*Primary Examiner*—Russell Adams
*Assistant Examiner*—Rodney Fuller
(74) *Attorney, Agent, or Firm*—Knobbe, Martens, Olson & Bear, LLP

(57) ABSTRACT

A projector 3 is provided for casting light toward the inside of a spherical screen 2. A first reflecting mirror 4 is arranged inside the spherical screen 2 on the optical axis 15 of the projector 3, and a second reflecting mirror 5 of a convex mirror on the optical axis 15 is arranged adjacent to a body tube 16 of the projector 3. The light emitted from the projector 3 is cast onto the entire surface of the spherical screen 2 via the first and second reflecting mirrors 4, 5. Images with virtual presence can be projected onto the entire surface of the spherical screen by the simple structures using the single projector.

16 Claims, 6 Drawing Sheets

FULL-SURROUND SPHERICAL SCREEN PROJECTION SYSTEM AND RECORDING APPARATUS THEREFOR

TECHNICAL FIELD

The invention relates to a full-surround spherical screen projection system that projects recorded images or computer graphic images, and particularly to a full-surround spherical screen projection system that can be used to project scenery of cities, housing spaces, flight simulators, game apparatuses and planetariums.

BACKGROUND ART

Recently, as a virtual reality visual display system that can give presence—the same feeling as if placed in a real situation—an immersive projection display which encloses viewers with a large screen projected in from the back has drawn attention. A sphere is an ideal shape for an immersive screen in that a distance from the viewer's eye to the projected images remains constant.

As a solid angle subtended by an image with respect to a viewer becomes larger, it is impossible to project the image sufficiently. Therefore, conventionally, from a plurality of plane screens was formed a polyhedral screen, on which the images recorded by a plurality of wide angle cameras corresponding to the plane screens were thrown by projectors.

However, when a plurality of cameras are used, there is a dead angle between adjacent cameras that does not allow recording. The dead angle may be negligible with respect to a subject in the distance, but as for a subject close by, the image of the subject corresponding to the distance between the edges of the lenses of adjacent cameras is missing.

The structure in a combination of plane screens produces a problem in that the ridges in the seams of each screen give an unnatural impression. In CG (Computer Graphic) images, a geometric correction is made to cope with the problem. Making a correction of recorded images, especially motion images, is difficult in original formatting stages. To do this, a plurality of cameras are needed and it takes time to correct the original images, which increases cost.

To solve, in principle, the problems of the dead angle and seams, it is necessary to obtain the images of a large solid angle by a single-system camera and project them onto a spherical screen by a single-system projector. Conventionally, as a means of a single-system projector throwing images on a spherical screen, fisheye lenses were used to throw image onto a semi-spherical screen. Yet, since the means produces a shadow when a viewer enters a semi-sphere projection screen, a viewer must view the screen from the outside of the semi-sphere, indicating that, in principle, enclosing a viewer at a solid angle of more than $2\pi$ is impossible. As a result, the means is not suitable to an immersive projection display.

In addition, a means can be thought of that, by a computer, controls, moves and tilts a reflecting mirror for the light from one projector to project in a wide range of angles onto a spherical screen. Yet that system cannot project entirely onto a spherical surface, and the structure is complex and expensive.

It is an object of the invention to solve the problems in the prior art. There is provided a full-surround spherical screen projection system that forms a spherical screen inside of a sphere, places a single-eyed projector, over a viewer, for projecting images in the inner direction of the sphere, provides, inside of the spherical screen, a first reflecting mirror opposed to the projector, provides a second reflecting mirror adjacent to the projector, and projects the images through the first and second reflecting mirrors from the projector on the screen. The screen projection system can throw images on the entire surface of the spherical screen except for the top and bottom of the sphere, with a wide visual field angle to the upper and lower directions and without casting a shadow by the viewer. The screen projection system is simple in structure, low in cost and spacious for the viewer.

The full-surround spherical screen projection system can be used to throw recorded images and CG images. At the stage of making original images to be thrown, distortion may be added to the original images beforehand. When thrown onto the spherical screen, the distortion of the images will be cancelled out to produce images without distortion.

DISCLOSURE OF INVENTION

To solve the problems, the invention provides a full-surround spherical screen projection system comprising a spherical screen formed inside of a sphere, a projector for projecting light toward the inside of the sphere, a first reflecting mirror constituting either a plane mirror or a concave mirror, placed above the center of the sphere inside of the sphere, for reflecting the light toward the outside of the sphere, and a second reflecting mirror constituting a convex mirror reflecting the light from the first reflecting mirror to the spherical screen, whereby the light from the projector is thrown on the entire surface of the spherical screen through the first and second reflecting mirrors.

The sphere may have an opening at a portion thereof, and the second reflecting mirror is placed in opposed to the opening within a radius from the center of the sphere.

The projector and the first and second reflecting mirrors are placed on the same optical axis, and the second reflecting mirror is either a circular reflecting mirror with a central hole that passes the light through from the projector or a half mirror.

The projector and the second reflecting mirror may be placed apart to the side along the inner wall of the sphere.

The projection system is used to throw images recorded by a projector or computer-generated images. The recorded images are made by a recorder comprising an elliptical convex mirror according to a curvature of the second reflecting mirror, a subject being recorded through the elliptical convex mirror.

BEST MODE FOR CARRYING OUT THE INVENTION

Figure 1:
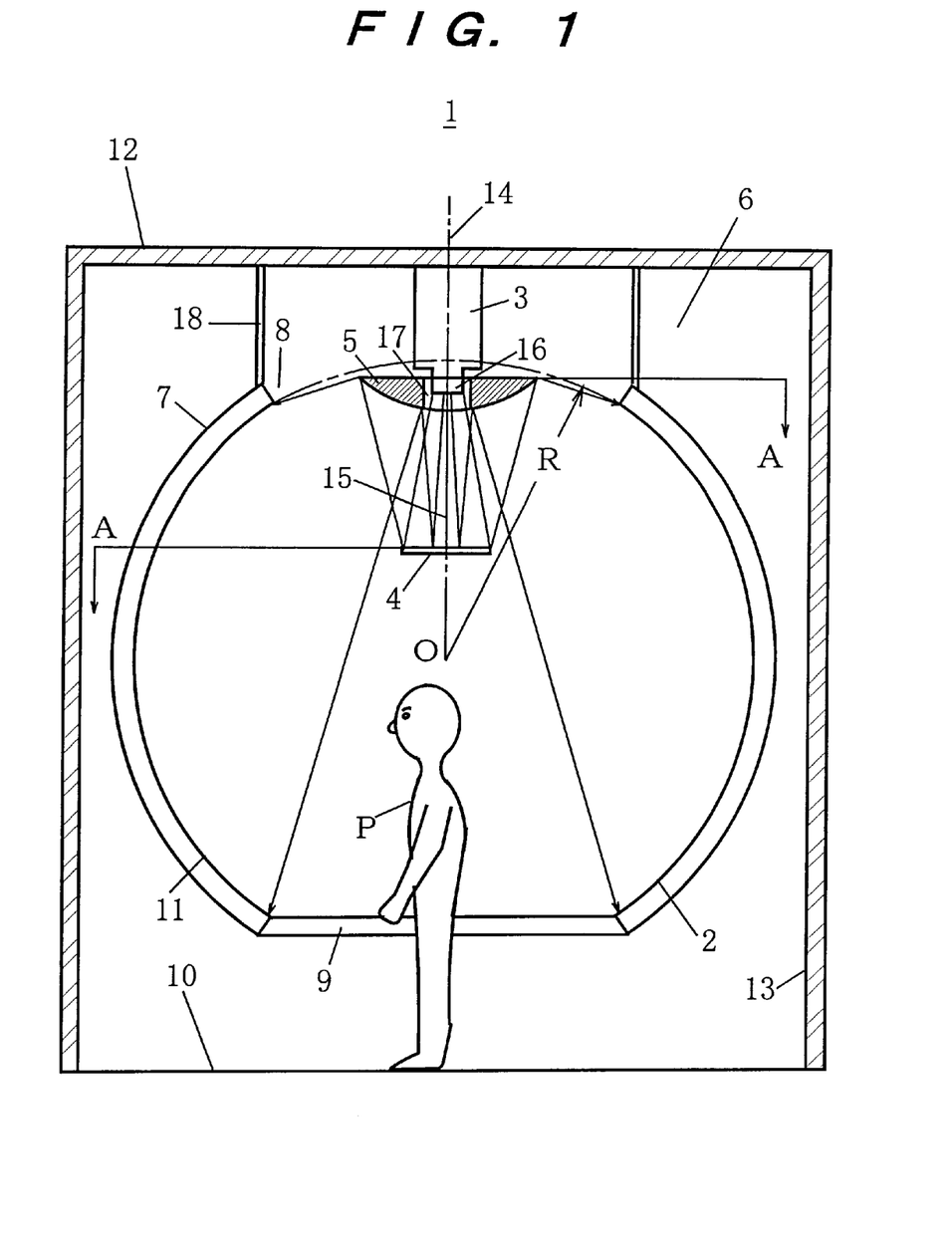
FIG. 1 shows a first embodiment of a full-surround spherical screen projection system in accordance with the present invention.
Figure 2:
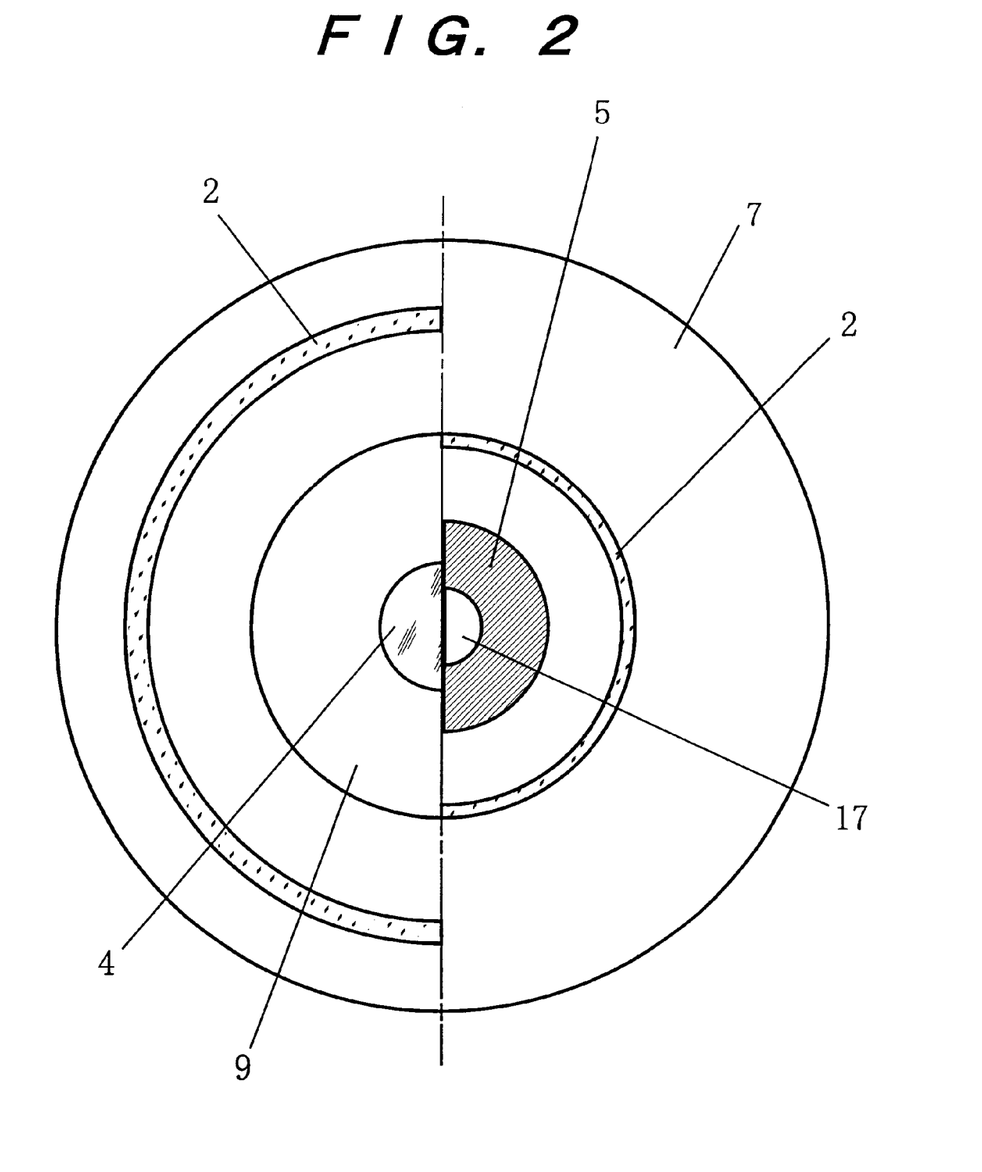
FIG. 2 is a sectional view with respect to A—A in FIG. 1.

The invention will be explained in more detail, referring to the figures showing the embodiments of the inventions. FIGS. 1 and 2 show a first embodiment of a full-surround spherical screen projection system in accordance with the present invention. FIG. 1 is a sectional view of a full-surround spherical screen projection system 1 seen from one side. FIG. 2 is a sectional view with regard to A—A in FIG. 1. In FIGS. 1 and 2, the full-surround spherical screen projection system 1 includes a spherical screen 2, a projector 3, a first reflecting mirror 4 and a second reflecting mirror 5, and is placed in a room 6, for example.

Openings 8, 9 are formed on a top and a bottom of a sphere 7, respectively. On the inside of the sphere 7, a screen surface 11 is provided to form the spherical screen 2. The material constituting the sphere 7 of the spherical screen 2 must be that which can maintain the structure of spherical shell of the sphere 7, such as plastic, metal, etc. To reduce reflecting sound in the sphere, it is preferable that it be a sound-absorbing material.

Conventional materials can be used for the screen surface 11. The spherical screen 2 is suspended from a ceiling wall 12 of a room 6 by a dangling support 18. The spherical screen 2 can be placed on legs that are fixed on a floor 10, or attached to a side wall of the room 6.

The projector 3 is placed on a central axis 14 of the sphere 7 corresponding to the surface 8. A light axis 15 of the projector 3 is present on the central axis 14 of the sphere 7.

The projector 3 may be any type of a liquid projector, a CRT projector or a film projector. Projected images may be any image of recorded images obtained by recording, or images generated by a computer. In the embodiments, projectors are attached to the ceiling wall 12 of the room and projected toward the inside of the sphere 7 through a body tube 16.

The first reflecting mirror 4 is positioned above the center of the sphere inside of the spherical screen, opposed to the mouth of the body tube 16 of the projector, the center of the mirror being on a light axis 15 of the projector 3. The first reflecting mirror 4 is suspended and supported from the ceiling wall by, for example, an attachment bar (not shown) such as a gut.

The positioning of the first reflecting mirror 4 is related to a projecting distance of the projector. As shown in FIG. 1, when the sphere 7 is small compared with a viewer and the projecting distance of the projector, the first reflecting mirror 4 is positioned slightly above the center of the sphere. However, when the sphere 7 is large compared with the projecting distance of the projector, the first reflecting mirror 4 is positioned higher above the center of the sphere.

On the other hand, because the center of the sphere is the most appropriate position for viewing, it is preferable that a viewer views from the center. In the invention, because the first reflecting mirror is placed above the center of the sphere, enough space is made at the center so that the viewer can view from the center without interference by the first reflecting mirror. For example, even when viewing from the center of the sphere, the viewer need not bend to avoid the projection optical system including the optical elements of the projector overhead, the first reflecting mirror and the second reflecting mirror, especially the first reflecting mirror, nor care about the system, which increases flexibility and enhances good viewing.

The first reflecting mirror 4 is formed by a plane mirror or a concave mirror. When the first reflecting mirror is a plane mirror, a dip, which reaches to the lower portion of the projected light reflected by the second reflecting mirror, is increased more than in a concave mirror. As a result, the upper and the lower visual fields are increased more than in a concave mirror. However, when the first reflecting mirror is a concave mirror, the space between the first reflecting mirror and the projector can be made smaller, which makes the projection optical system compact.

The second reflecting mirror 5, opposed to the opening 8 and the body tube 16 of the projector 3, is placed on the optical axis of the projector 3, with the distance from center O of the sphere 7 to the second reflecting mirror 5 shorter than a radius R of the sphere 7. The second reflecting mirror 5 has a central hole 17 which allows the projected light to pass through, and is formed in a ring shape (a doughnut shape). The center of the second reflecting mirror 5, which is attached to the ceiling wall 12 through an attachment bar (not shown) such as a gut, lies on the light axis 15. The mirror surface of the second reflecting mirror 5 is shaped to be a convex mirror and is manufactured, for example, by precisely grinding aluminum alloy and performing surface processing such as plating and electrolyte polishing. The second reflecting mirror 5 can be a half mirror, rather than a circular mirror with the central hole 17.

In the projection optical system of the above first embodiment, which includes the projector, the first and second reflecting mirrors, each optical element is placed on the same optical axis. The scope of the spherical screen is axially symmetrical. However, in the optical system of the invention, each optical element is not necessarily placed on the same optical axis. When the image scope of the spherical screen 2 is not symmetrical with a large bias in the forward direction and a small bias in the backward, the projector can be arranged so that it can be projected at a slant.

As a modification of the first embodiment, the projector may be placed to the side (the circumferential direction of the sphere 7), with the optical axis of the projector shifted from that of the second reflecting mirror. With respect to the first reflecting mirror, for example, the projected light is hit at an angle from the back and above. As a result, a full-surround spherical screen projection system can be realized that projects images in a larger range toward the front of the screen instead of the axisymmetrical range. In the modification of the first embodiment, the sphere constituting the screen has the opening 8. An embodiment, where the sphere constituting a screen does not have an opening and each optical clement of a projection optical system is not on the same optical axis, is explained as a third embodiment below.

The function of the full-surround spherical screen projection system I of the first embodiment in accordance with the invention with the structure shown above will be described below. When seeing the pictures on the spherical screen 2, a viewer P is almost at the central axis of the spherical screen 2. The projection light from the projector 3 is cast in a downward direction in the Drawing to be reflected upward to the second reflecting mirror 5 by the first reflecting mirror 4. The reflected light is reflected once again by the mirror of the second reflecting mirror 5 and spread downward. The projection images are cast to the viewer without interference on the entire circumferential surface of the spherical screen 2 except for the top and bottom of the sphere 7.

According to the full-surround spherical screen projection system 1, the viewer P can, from the interior of the spherical screen 2, observe the images projected on the entire circumferential surface of the spherical screen except for the top and bottom of the sphere. Generally, it is when a light source is directly above that the shadow of the viewer becomes the smallest. Utilizing that principle and setting the projection optical system of the full-surround spherical screen over the head of the viewer reduce the portion blocked from being projected on by the viewer.

With the full-surround spherical screen projection system of the invention, the pictures cannot, in principle, be projected to the top and bottom of the sphere. However, this point does not generally produce any inconvenience with the full-surround spherical screen projection system of the invention, because people do not look directly above and/or below when observing scenery. When the full-surround spherical screen projection system of the invention is used to obtain images at the bottom, a floor projection screen for back projection may be prepared separately.

When the recorded images are projected on the screen by the full-surround spherical screen projection system of the invention, distortion is produced in the screen images. Accordingly, it is necessary beforehand to distort the images to be cast so that the viewer sees no distortion when the images are projected on the screen.

Figures 3, 3A, 3B:
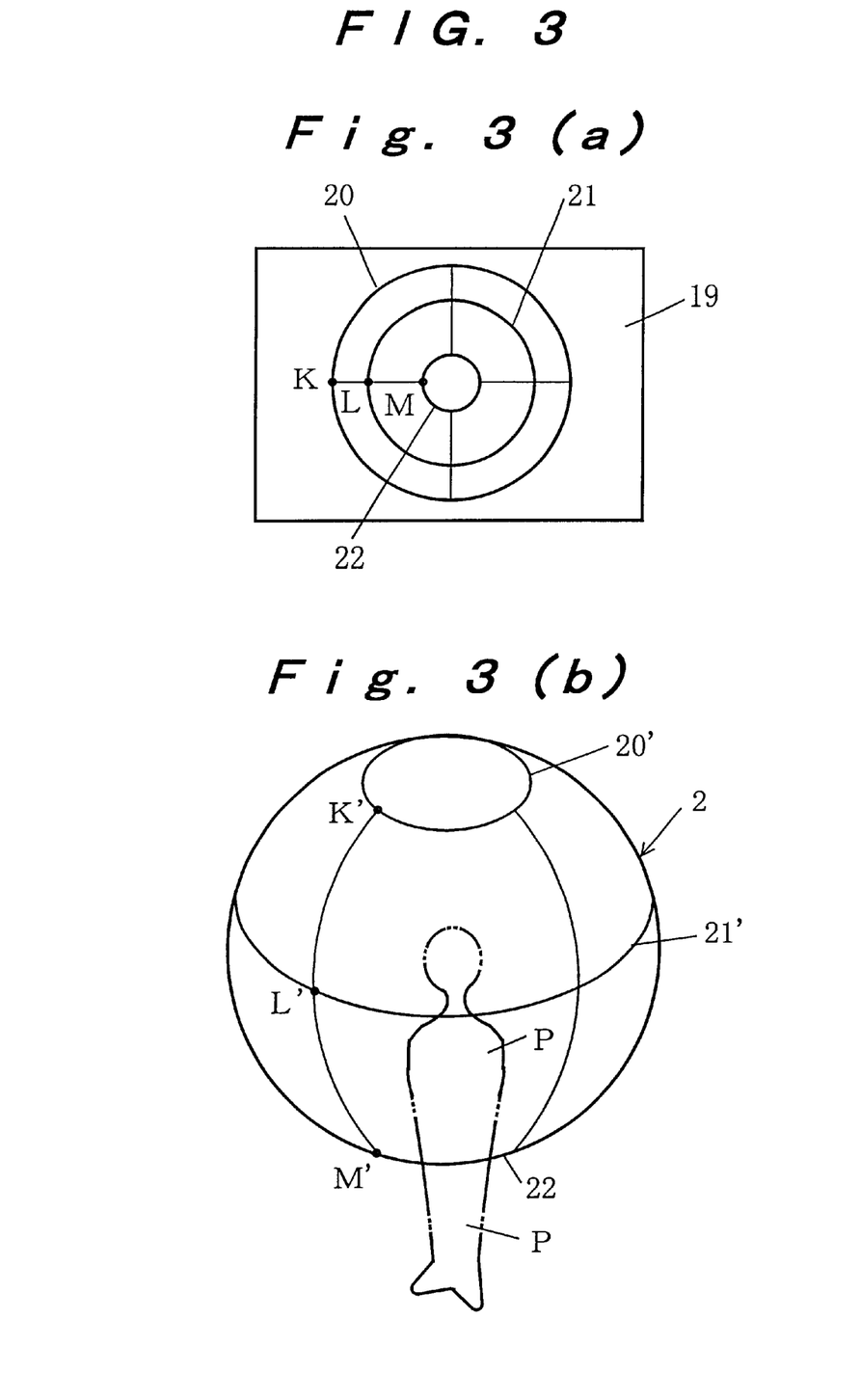
FIG. 3 shows the relationship between a projected image and a screen image in accordance with the present invention.

This will be explained in FIG. 3. An outer circle 20, an intermediate circle 21 and an inner circle 22 in the rectangular image 19 for the projection system are, as shown in FIG. 3(a), placed at non-equal intervals between the adjacent circles of the three circles. However, the circles are, as shown in FIG. 3(b), projected as an upper circle 20', an intermediate circle 21' and a lower circle 22' at equal intervals on the spherical screen 2. Points K, L and M in the rectangular image are projected as K', L' and M' on the spherical screen 2. Therefore, the circles at equal intervals thrown on the spherical screen 2 of FIG. 3(b) are not placed at equal intervals on the rectangular image 19 for the projection system in FIG. 3(a), at the stage of recording or making CG. That is, the images must be made beforehand as distorted circles.

Figure 4:
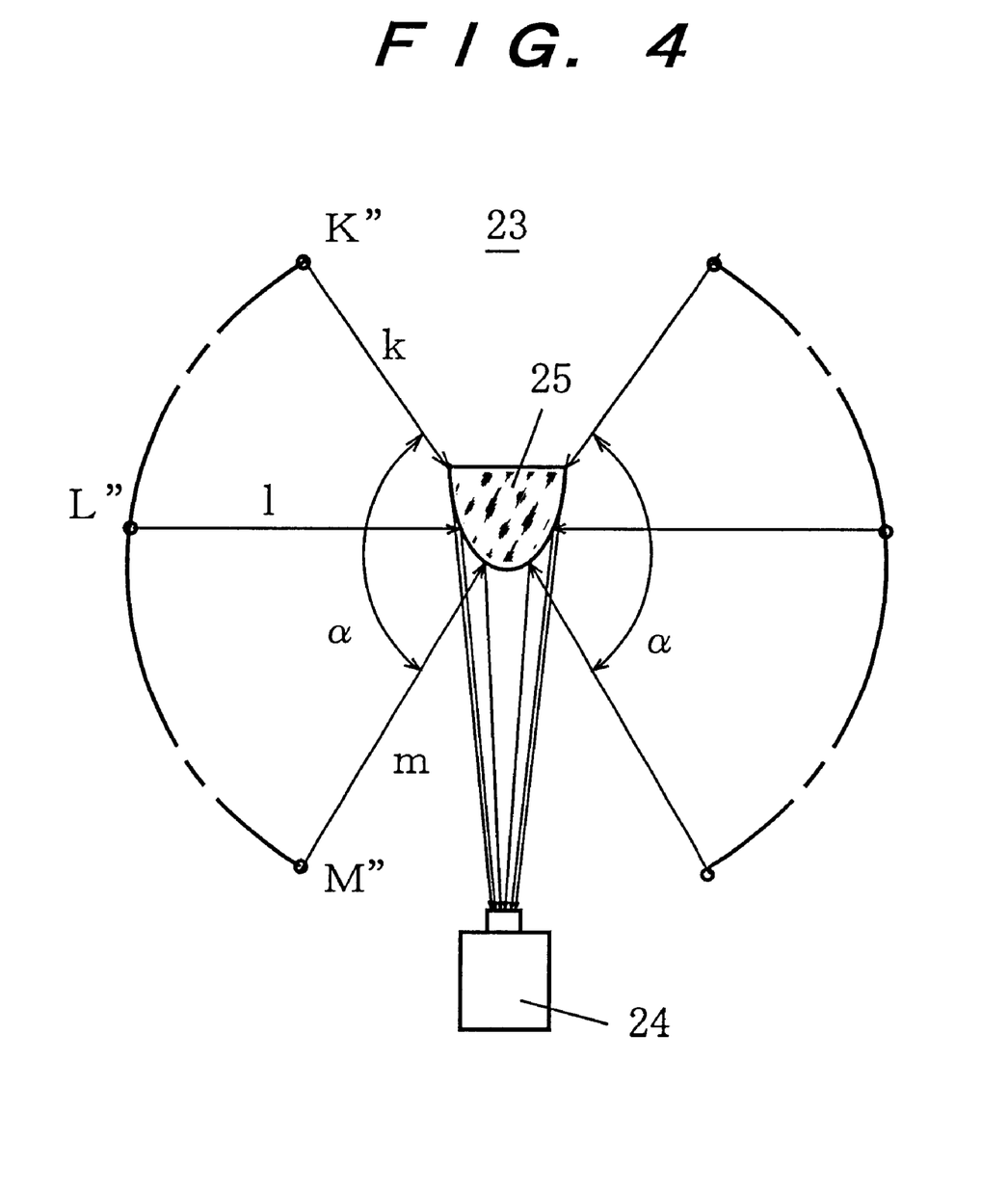
FIG. 4 is a plane view of an embodiment of an image recording apparatus (recorder) in accordance with the present invention.

To form images with distortion beforehand in recording, an image recording apparatus 23 as shown as an embodiment in FIG. 4 is used. The recording apparatus 23 includes a recording camera 24 and an elliptical convex mirror 25 placed above the recording camera 24. When recording a subject in the area of an angle α defined by a straight line k and a straight line m, a point K" on the line k, a point M" on the line m, and L" on the line I are recorded as K, L, and M, respectively, of the rectangular image distorted beforehand as shown in FIG. 3(a), through the elliptical convex mirror 25 by the recording camera 24.

When designing the suitable position of a focal point of the elliptical convex mirror 25, taking into consideration the second reflecting mirror 5 of the full surround screen projection system 1, distortionless images will be thrown on the spherical screen 2. When recorded images of surrounding scenery obtained by the recording apparatus 23 are cast by the projector, the viewer can observe the image scenery with virtual presence, as if he were observing the surrounding scenery at the place where the images were recorded. As for CG images, considering the distortion that will be produced in casting, recorded images can be created by a computer.

In the first embodiment above, an opening 8 is formed at the top of the sphere. The projector 3 is placed opposed to the opening 8. However it is not necessary to have an opening at the top of the sphere. It is possible that by providing a large spherical screen in a large room, a viewer can be completely inside of the spherical screen for viewing. It is anticipated that the projection system will be made increasingly compact in the future. If the projection system is compact enough, it can be arranged inside of the spherical screen. The projector may be placed away from, not at, the top of the sphere. This example will be explained as a second embodiment.

Figure 5:
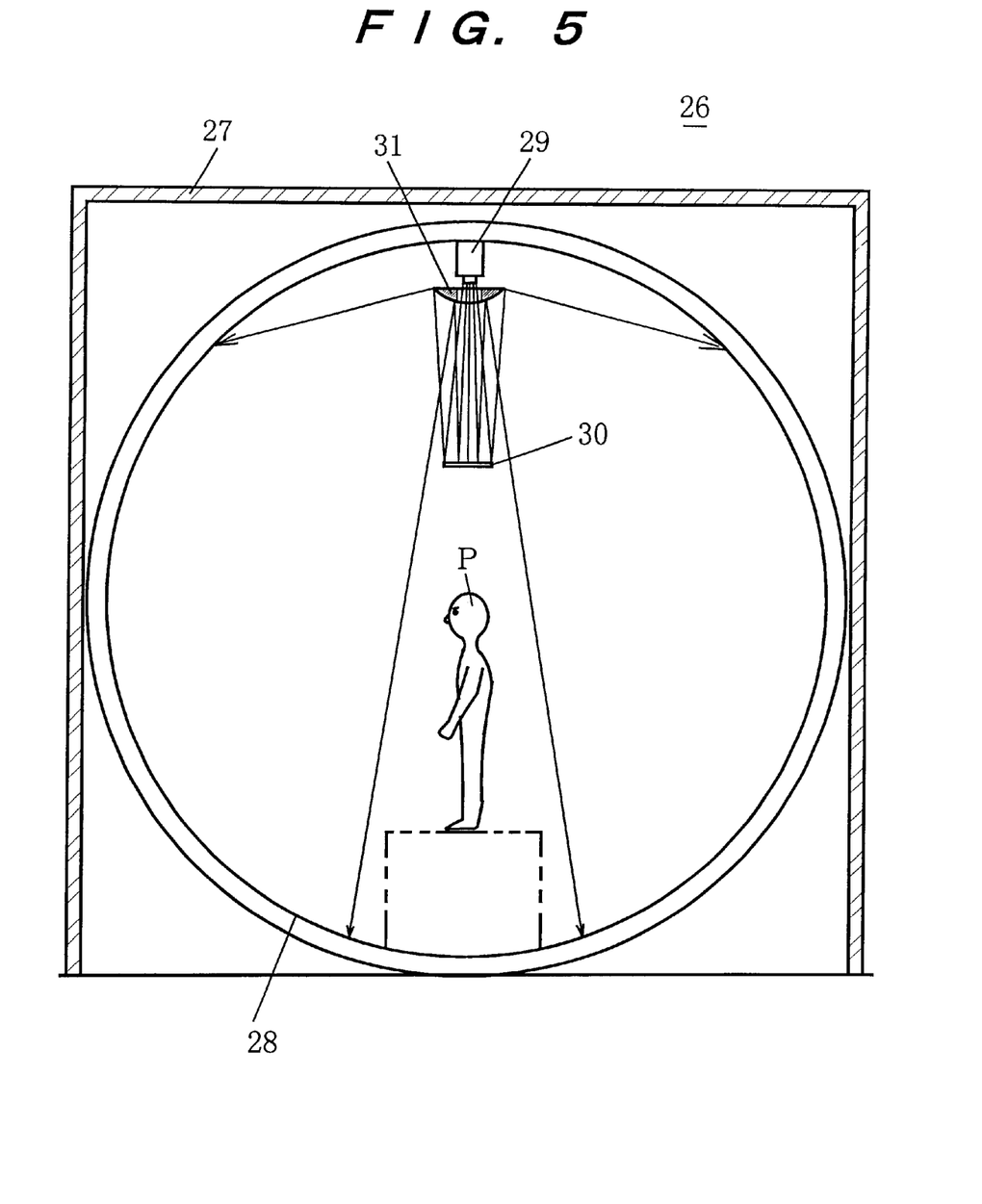
FIG. 5 shows a second embodiment of a full-surround spherical screen projection system in accordance with the present invention.

FIG. 5 shows a second embodiment of a full-surround spherical screen projection system 26 in accordance with the invention in which a large spherical screen 28 is provided in a large room 27 such as a theater. In the full-surround spherical screen projection system 26, a screen 28 does not have the openings shown in the first embodiment, apart from an entrance for people and materials. The structure is made so that the viewer can be inside the spherical screen 28 for viewing. A projector 29 is provided inside of the spherical screen 28. The projector 29, a first reflecting mirror 30 and a second reflecting mirror 31 are on the same optical axis, as in the first embodiment. The first reflecting mirror 30 is either a plane mirror or a convex mirror; the second reflecting mirror 31 is a circular concave mirror or a half mirror, whose functions are the same as those in the first embodiment.

In the first and second embodiments, the projector 3/29 is arranged further away from the second reflecting mirror 5/31 with reference to the first reflecting mirror 4/30, because this prevents the projector 3/29 from producing a shadow when the reflecting light is cast from the first reflecting mirror 4/30. However, if the projector 3/29 is small, even if the projector 3/29 is placed at a more inner position than the second reflecting mirror 5/31 with reference to the first reflecting mirror 4/30, a shadow produced by the projector 3/29 is small and within a range corresponding to the dead space above and does not result in a lack of images. Accordingly, if the projector 3/29 is made small, the projector 3/29 may be placed at a more inner position than the second reflecting mirror 5/31 with reference to the first reflecting mirror 4/30. In this case, the second reflecting mirror 5/31 does not have to be a circular reflecting mirror or a half mirror as in the first and second embodiments, and can be a convex mirror such as a commercially available comer mirror.

Figure 6:
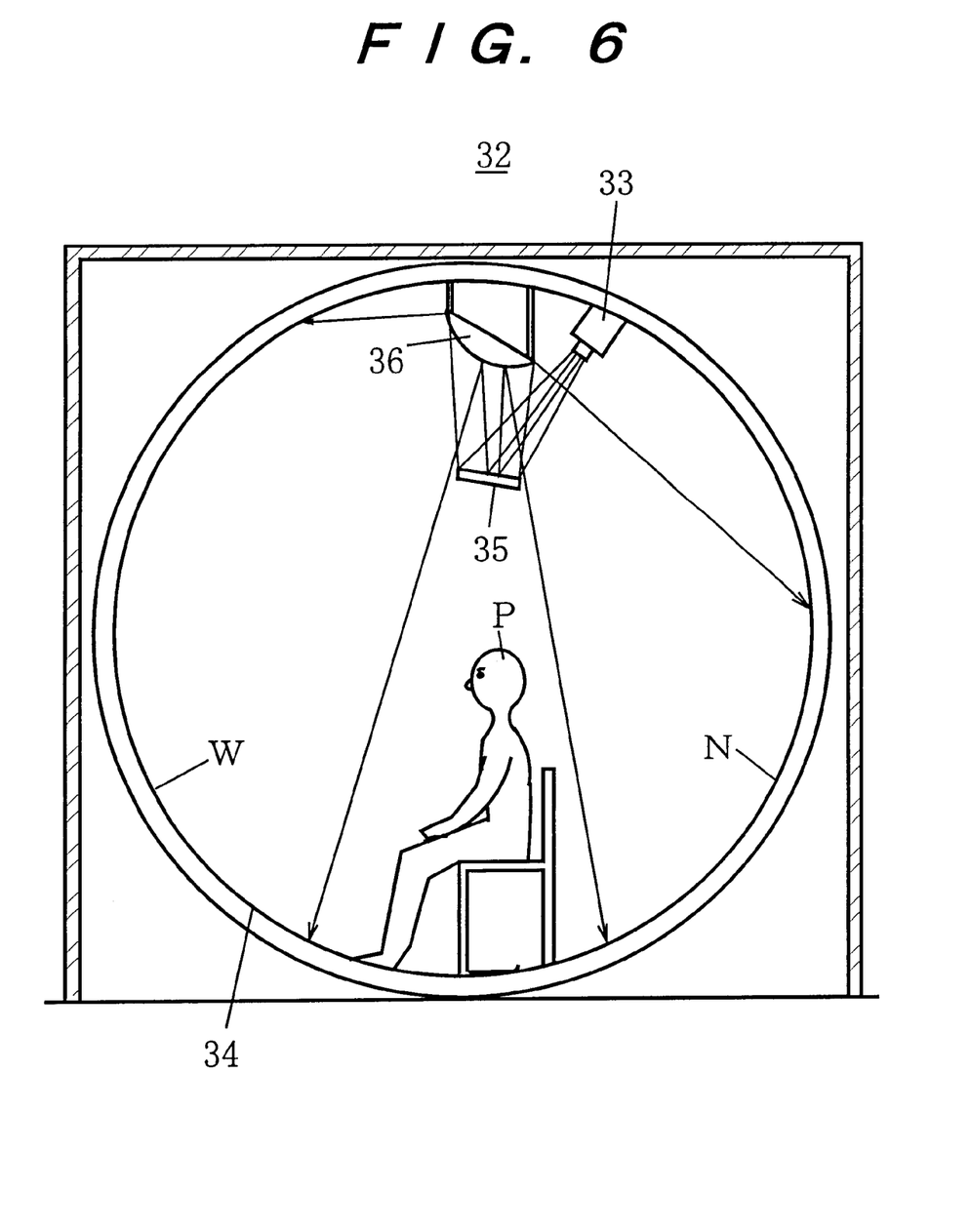
FIG. 6 shows a third embodiment of a full-surround spherical screen projection system in accordance with the present invention.

FIG. 6 shows a full-surround spherical screen projection system 32 of a third embodiment in accordance with the invention. Although the projector and the first and second reflecting mirrors arc on the same optical axis in the first and second embodiments and axisymmetric, the optical positioning of those optical elements in the full-surround spherical screen projection system 32 of the third embodiment is different.

In the full-surround spherical screen projection system 32, a projector 33 is placed away from the top of a spherical screen 34 at a slant. A first reflecting mirror 35 such as a plane mirror or a concave mirror is put at a slant under the top of a spherical screen 34. Above the first reflecting mirror 35 is arranged at a slant a second reflecting mirror 36 of a convex mirror. The first and second reflecting mirrors 35 and 36 sequentially reflect the projected light from the projector 33, and the images are projected onto the spherical screen 34.

By the full-surround spherical screen projection system 32 having the above structures, the images is projected in a wide range W on the screen in front of the projector 33 (left screen in FIG. 6), but in a narrow range N on the screen behind the projector (right screen in FIG. 6). That is, the images are projected asymmetrically with respect to the axis. Because the second reflecting mirror, which does not have holes or is not a half-mirror in the first and second embodiments, may be a convex mirror such as a commercially available comer mirror, it can be operated very easily.

The full-surround spherical screen projection system 32 does not allow the viewer to look at the images on nearly the entire sphere with the same upper and lower visual field angles by looking to the back or turning to the side as in the full-surround spherical screen projection system 1/26 of the first and second embodiments, but allows the viewer to look at all the images in the visual field defined by the viewer's sitting position. Accordingly, it is applicable to a flight simulator where the images in the visual field can be changed for operation practice while sitting at an operation seat.

As explained above, according to the full-surround spherical screen projection systems, the spherical screen is formed on the inside of the sphere, a single-eye projector is provided that projects the images toward the inside of the sphere, a first reflecting mirror opposed to the projector is provided inside the spherical screen, a second reflecting mirror near the projector is provided, and the projected images from the projector are projected onto the spherical screen via the first and second reflecting mirrors. In this way, the invention has a simple and low-cost structure of the single-eye projector only, and can project images with virtual presence on the entire spherical screen except for the top and bottom of the sphere, without a shadow of the viewer.

The invention may use a plane mirror or a concave mirror as the first reflecting mirror. When a plane mirror is used, the visual field angle can be widened in the upper and lower directions. If a concave minor is employed, the distance to the projector can be shortened, which leads to a compact optical projection system. In addition, since the invention allows the optical projection system to place the spherical mirror above the center of the sphere forming a spherical mirror, the viewer can see well with increased leeway while standing.

Since the invention distorts original images beforehand at the stage of manufacturing the original images by recording or CG so that the distortion can be cancelled when the original images are projected, there will be no distortion in the images projected on the spherical screen.

INDUSTRIAL APPLICABILITY

If the scenery of cities and towns or the look of stores and houses in design stages are simulated by a computer, their images are formed and the formed images are projected by a projector, the full-surround spherical screen projection systems of the invention enable understanding of the surroundings and their impressions in all the directions without constructing real cities and towns and building real housing spaces. Therefore, the invention can be used as a valuable evaluation or supplemental means for the design of cities, towns, buildings, and housing spaces.

When images of the surroundings as seen from a cockpit of an airplane are recorded or simulated by a computer and projected on a spherical screen by the full-surround spherical screen projection system of the invention to use as a flight simulator, simulated operation practice can be conducted in a situation close to real scenery shown in all the directions.

When astronomical objects in continuous transition are transformer into images to be projected onto a spherical screen by the full-surround spherical screen projection system, only one single-eye projector is needed without the need to use a plurality of projectors as in the prior art, which provides a planetarium with economical facilities.

What is claimed is:

1. A full-surround spherical screen projection system comprising:
    a spherical screen formed inside of a sphere;
    a projector for projecting light toward the inside of said sphere, said projector emitting a pre-distorted image of a subject, which pre-distorted image is configured to be cast on said spherical screen;
    a first reflecting mirror comprising either one of a plane mirror or a concave mirror, placed away from the center of said sphere inside of said sphere, for reflecting the light toward the outside of said sphere; and
    a second reflecting mirror constituting a convex mirror reflecting the light from said first reflecting mirror to said spherical screen, said second reflecting mirror being disposed further away from the center of said sphere than is said first reflecting mirror, said convex mirror being configured to compensate for the distortions of the pre-distorted image, whereby an image of the subject is cast on the spherical screen without distortions.

2. The full-surround spherical screen projection system of claim 1, wherein said sphere has an opening at a portion thereof, and said second reflecting mirror is placed in opposed to said opening within a radius from the center of said sphere.

3. The full-surround spherical screen projection system of claim 2, wherein said projector and said first and second reflecting mirrors are placed on the same optical axis, and said second reflecting mirror is either a circular reflecting mirror with a central hole that passes the light through from said projector or a half mirror.

4. An image recording apparatus for the full-surround spherical screen projection system of claim 3, comprising:
    an elliptical convex mirror according to the curvature of said second reflecting mirror; and
    a recording camera for recording a subject through said elliptical convex mirror.

5. The full-surround spherical screen projection system of claim 2, wherein said projector and said second reflecting mirror are placed apart to the side along the inner wall of said sphere.

6. An image recording apparatus for the full-surround spherical screen projection system of claim 5, comprising:
    an elliptical convex mirror according to the curvature of said second reflecting mirror; and
    a recording camera for recording a subject through said elliptical convex mirror.

7. An image recording apparatus for the full-surround spherical screen projection system of claim 2, comprising:
    an elliptical convex mirror according to the curvature of said second reflecting mirror; and
    a recording camera for recording a subject through said elliptical convex mirror.

8. The full-surround spherical screen projection system of claim 1, wherein said projector and said first and second reflecting mirrors are placed on the same optical axis, and said second reflecting mirror is either a circular reflecting mirror with central hole that passes the light through from said projector or a half mirror.

9. An image recording apparatus for the full-surround spherical screen projection system of claim 8, comprising:
    an elliptical convex mirror according to the curvature of said second reflecting mirror; and
    a recording camera for recording a subject through said elliptical convex mirror.

10. The full-surround spherical screen projection system of claim 1, wherein said projector and said second reflecting mirror are placed apart to the side along the inner wall of said sphere.

11. An image recording apparatus for the full-surround spherical screen projection system of claim 10, comprising:
   an elliptical convex mirror according to the curvature of said second reflecting mirror; and
   a recording camera for recording a subject through said elliptical convex mirror.

12. An image recording apparatus for the full-surround spherical screen projection system of claim 1, comprising;
   an elliptical convex mirror according to the curvature of said second reflecting mirror; and
   a recording camera for recording a subject through said elliptical convex mirror.

13. The system according to claim 1, wherein the second reflecting mirror is disposed close to a periphery of the sphere.

14. The system according to claim 1, wherein said pre-distorted image is an image recorded through the convex mirror using an image recording apparatus including the convex mirror.

15. The system according to claim 1, wherein said pre-distorted image is an image generated using a computer graphic technique.

16. An apparatus comprising: a full-surround spherical screen; a projector; and a means for projecting images substantially without distortions onto said full-surround spherical screen from said projector, said means being located away from the center of said full-surround spherical screen.

* * * * *